Patented Feb. 21, 1950

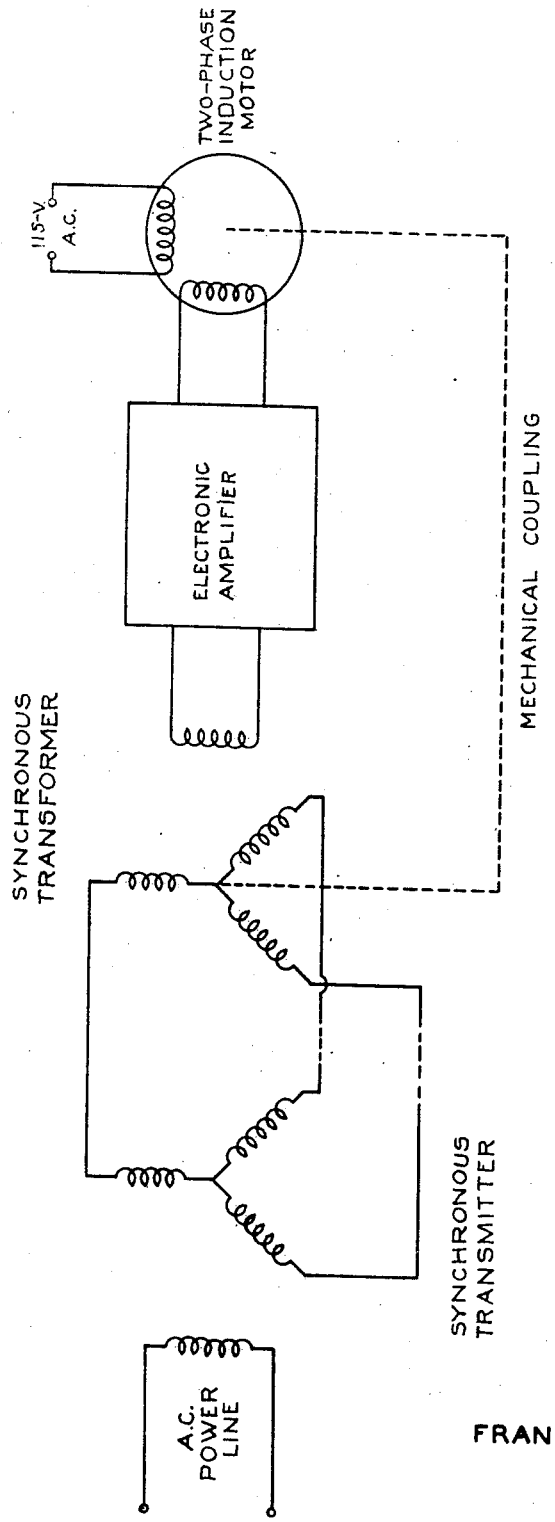

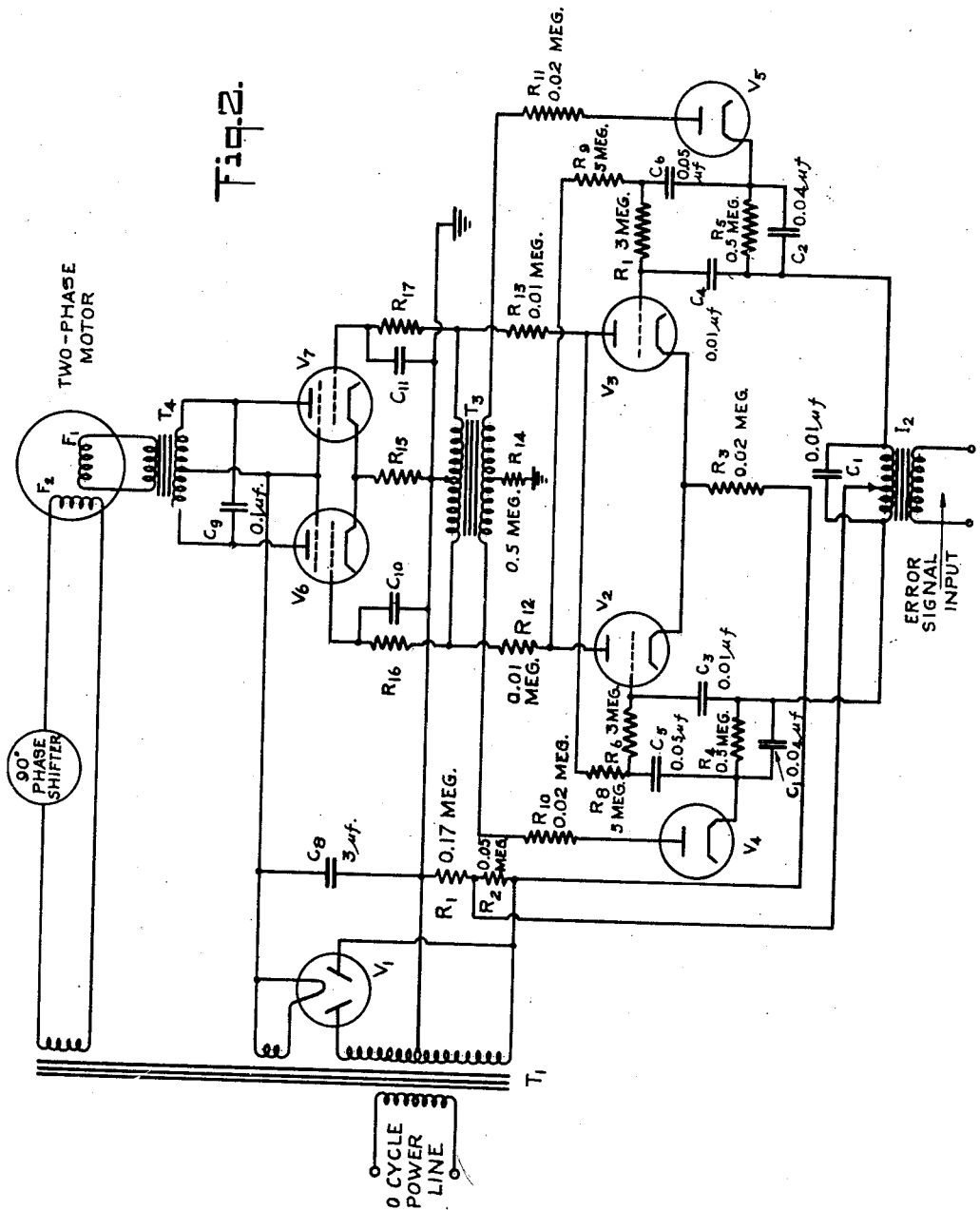

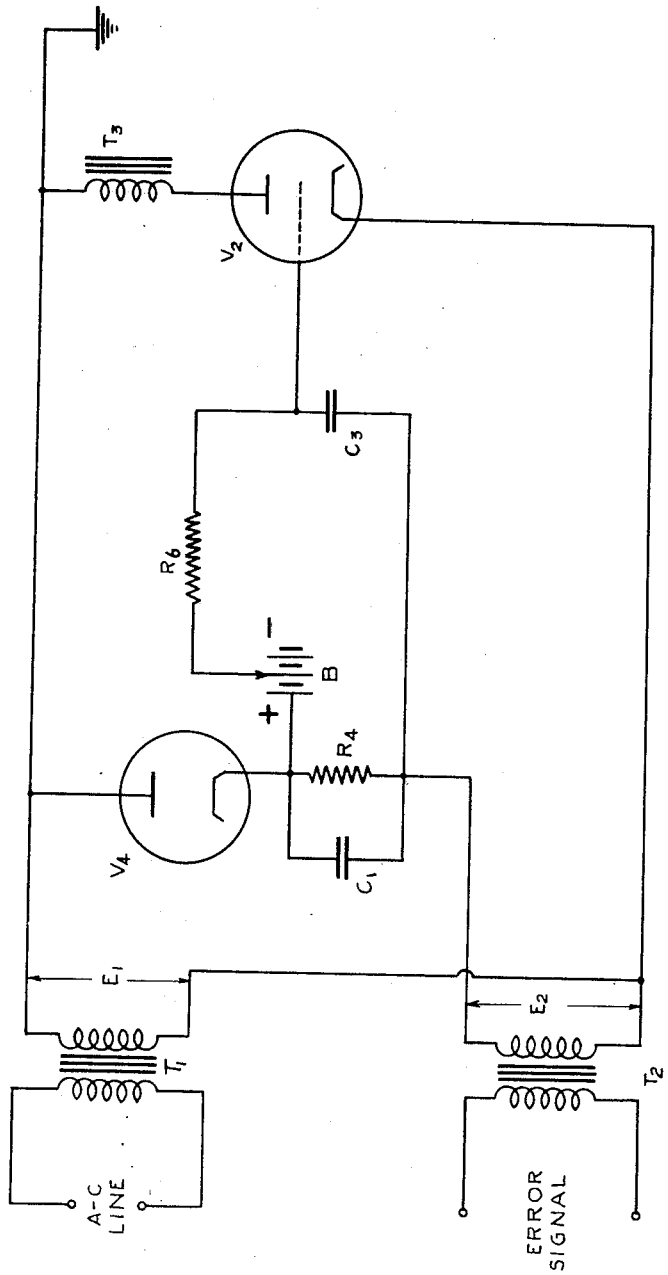

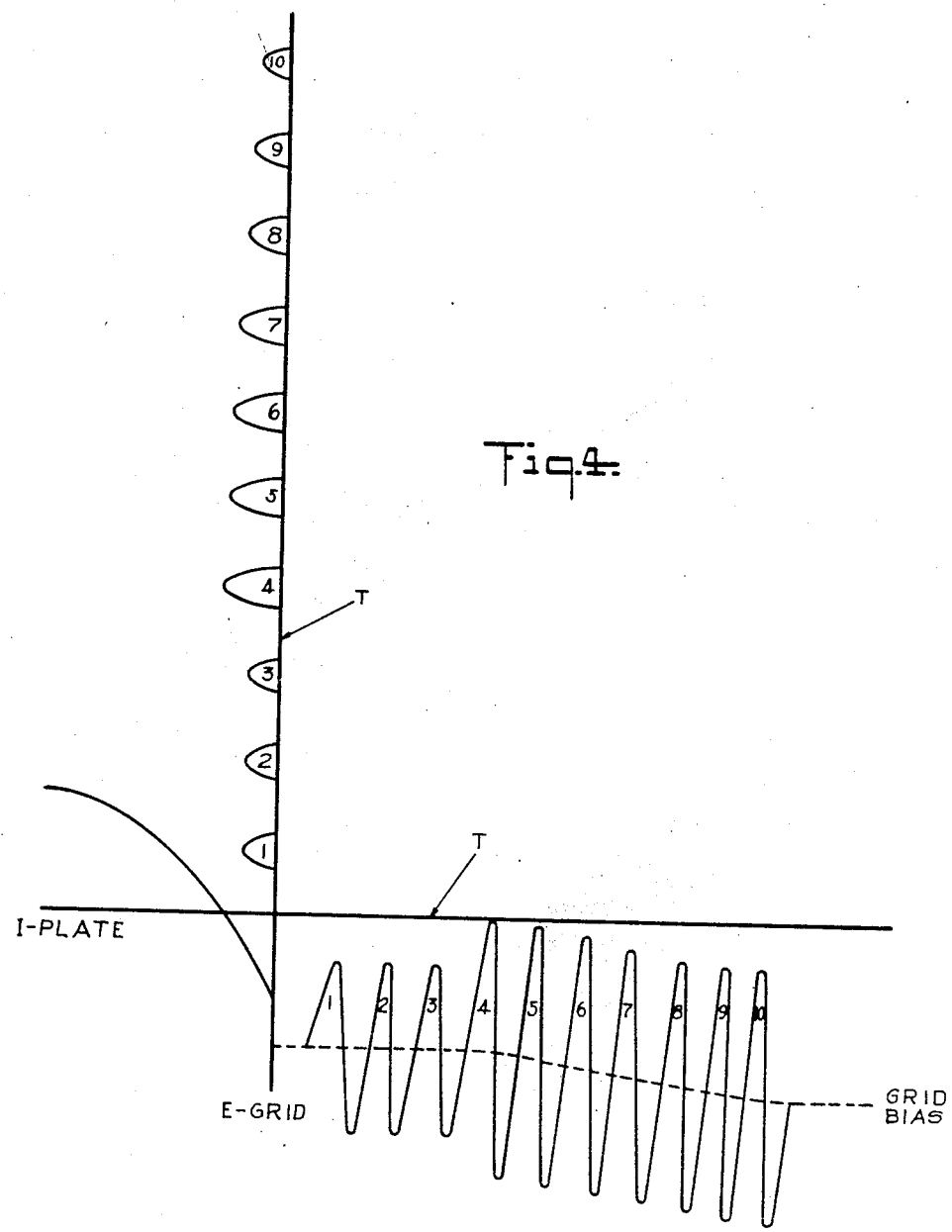

2,497,962

UNITED STATES PATENT OFFICE 2,497,962

ELECTRONIC AMPLIFIER FOR SERVO DEVICES

Francis H. Shepard, Jr., Madison, N. J., assignor, by mesne assignments, to Remco Electronic, Inc., New York, N. Y., a corporation of New York Application November 18, 1944, Serial No. 564,112

9 Claims. (Cl. 318—30)

A very useful type of servo device is one in which a synchronous transmitter, or director Selsyn, supplies excitation to a synchronous transformer, or receiver Selsyn, and the signal output of the synchronous transformer is amplified by an electronic amplifier which excites a two-phase motor to drive the synchronous transformer to its zero-signal position. My invention is directed toward a new amplifier circuit for use in this type of servo device.

In the drawings,

Figure 1 is a block diagram of the servo device described above;

Figure 2 shows the circuit diagram of my invention;

Figure 3 shows a simplified version of Figure 2; and

Figure 4 shows the waveform of grid voltage in Figure 3, when the error signal increases.

In Figure 1 the synchronous transmitter and transformer are connected in a conventional manner. When the rotor of the synchronous transformer is in the called-for position, that is, when it has the same angular position as the rotor of the transmitter, there is no signal output from the transformer. When the transformer rotor is not in this position, the transformer has a 60-cycle output voltage whose amplitude is approximately proportional to the sine of its angular displacement from the called-for position. It is convenient to call this angular displacement the error, and the resultant 60-cycle transformer output the error signal. The error signal is in phase with the A.-C. line voltage when the error is in one direction, and 180° out of phase when the error is in the other direction.

The phase of the A.-C. output supplied by the amplifier to the motor depends on the phase of the error signal and reverses phase if the error signal reverses phase. Because the direction of motor rotation depends on the phase of its excitation, the direction of motor rotation depends on the direction of error. The circuit is so arranged that the motor rotates and turns the synchronous transformer rotor always in the direction to reduce the error signal to zero. The motor therefore drives the synchronous transformer rotor always toward the called-for position and thus makes it follow motions of the synchronous transmitter rotor.

In Figure 2, the plates of triodes V2 and V3 are returned to ground through the center-tapped primary of transformer T3. An alternating voltage of approximately 350 volts R. M. S. is applied to the cathodes through resistor R3 from the lower end of the high-voltage secondary winding of transformer T1 whose center-tap is grounded, the primary of transformer T1 being supplied from the conventional 60 cycle power line. With this arrangement, plate current in V2 and V3 flows in pulses during those half-cycles of the 60-cycle voltage when the cathodes are swung negative with respect to ground. The error signal input is supplied to the primary of transformer T2 each of whose outer secondary winding terminals is coupled to the grid of a respective tube V2, V3, through respective coupling condensers C3, C4, the center tap of the secondary of T2 being connected to the junction of resistors R1, R2 connected in series across the lower half of the secondary of T1. When there is no error signal applied to the grids of V2 and V3, the plate current pulses of V2 and V3 are equal. These equal current pulses cause equal negative voltage pulses to be applied to the grids of the output tubes, V6 and V7, which grids are coupled respectively to the plates of tubes V2, V3 by way of respective resistors R16, R17 and the respective load resistors R12, R13. As a result, the plate currents of V6 and V7 pulse negatively by equal amounts. Because these pulses are equal, they cancel out in the output transformer T4 coupled in push-pull fashion to tubes V6, V7, so that there is no voltage supplied to the motor winding F1 coupled directly to the secondary of T4. Hence, when the error signal is static at zero, the motor does not develop any torque.

When the synchronous-transformer rotor is displaced from the called-for position and held stationary, error signal is applied in push-pull to the grids of V2 and V3 through condensers C3 and C4 by the secondary of transformer T2. The error signal on the grid of V2 will be, depending on the direction of error, either in phase, or 180° out of phase, with the alternating voltage applied to the cathode of V2. If the error voltage on this grid is out of phase with the cathode voltage, the error signal swings this grid in the positive direction and the grid of V3 in the negative direction during the conducting half cycles. Under this condition, the plate current pulses of V2 are larger than those of V3, and, consequently, the negative pulses in the plate current of V6 have larger amplitude than those of V7. The resultant unbalance current in the primary of transformer T4 causes a 60-cycle voltage to be applied to motor winding F1. Thus the error signal causes the motor to develop torque.

If the synchronous-transformer rotor were displaced in the direction opposite to that assumed above and held stationary, the error signal would cause the plate current pulses in V3 to be larger than those in V2 and, consequently, the motor would develop torque in the direction opposite to that of the previous paragraph. From this explanation, it can be seen how the amplifier is able to drive the motor always in the correct direction.

The function of the diodes V4 and V5 is to prevent hunting. It is well known in the art that, in a servo of the type shown in Figure 1, hunting can be prevented by making the amplifier and motor develop a component of torque proportional to the time derivative of error-signal amplitude. The diode circuit provides this component of torque in a manner which can be explained by reference to Figure 3.

This figure shows the diode circuit in simplified form, only one side of the push-pull input stage being shown. Circuit parts in this figure have the same designating numbers as the corresponding parts in Figure 2. When the error signal is zero, the diode charges up condenser C1 to the peak value of the alternating voltage E1 across the secondary of transformer T1. The tap on the battery B is adjusted so that with this voltage across C1, the grid is biased negative with respect to the cathode of V2. This negative bias, the normal bias, is such that when the cathode of V2 is at or near the negative peak of its alternating voltage, the grid is midway between cut off and zero bias with respect to the cathode. At all other points in the cycle of alternating cathode voltage, the cathode is highly positive with respect to the grid. Hence plate current flows only in narrow pulses during the short periods when the cathode is at or near the negative peak of its alternating voltage.

Suppose now that the error signal increases suddenly to amplitude E2, and that the phase of the error signal is such as to swing the grid of V2 in the positive direction during the positive half of the plate voltage cycle. With error signal in this phase, the alternating voltage across the diode is reduced by E2 volts. Figure 4 shows the resultant variation in the voltage of the grid of V2 with respect to cathode.

Figure 4 shows that up to the time T when the error signal increases, the grid is at normal bias, as explained above. When the error signal increases, the positive half cycles of error signal swing the grid more positive than normal bias during the plate current intervals and therefore increase the amplitude of plate current during these pulses. However, the error signal also reduces the alternating voltage across the diode and therefore reduces the positive unidirectional voltage supplied to the grid from condenser C1. This reduction in positive voltage does not appear immediately at the grid because of the time delay introduced by R6 and C3. After a time, dependent on the time constant of R6 and C3, the unidirectional voltage at the grid reaches a new value, more negative than normal bias by E2 volts. From then on, as long as the error signal does not increase, the potential of the grid during the plate-current pulses is the same as before time T, since the change in bias on the grid compensates for the increase in error signal. The amplitude of pulses is therefore essentially the same as before time T. The grid of V3 for the same signal becomes more negative during the short plate current pulses and the alternating voltage across its diode is increased by E2 volts. Plate current through V3 is accordingly reduced until the grid of V3 assumes a more positive bias, after which there is no resultant change in plate current.

The important point to be noted is that for a short time after the increase in error signal, the plate current pulses in V2 are larger than they was during zero error signal. However, after the new value of error signal has persisted for some time, the amplitude of plate current pulses is substantially the same as it was during the period when the error signal amplitude was constant at zero. If the error signal amplitude were increased at a constant rate, the plate current pulses would become larger than their zero-signal value and would remain larger as long as the rate of signal increase continued. Further, the increase in plate current pulse amplitude would be approximately proportional to the rate of signal increase. In other words, the amplitude of plate current pulses has a component which is proportional to the time derivative of error signal amplitude. The circuit is therefore suitable for use in preventing hunting.

In Figure 2 the voltage across transformer T3 is a partial derivative of the differential current through the transformer. It is therefore necessary to take a partial integral of this voltage in order to obtain a voltage which is a direct in-phase function of the differential currents passed by the tubes V2 and V3. This is done by condensers and resistances C10, R16 and C11, R17, so that the voltage appearing on the grids of tubes V6 and V7 is a voltage in phase with the currents in tubes V2 and V3 and hence in phase with the error signal and supply voltage.

It can be seen that, in Figure 2, the circuit of Figure 3 is somewhat modified. In the circuit of V2, for example, the grid is isolated by condenser C5 from the unidirectional voltage across condenser C1. Because of this isolation, it is not necessary to use the bucking battery B of Figure 3 in order to bring the grid to normal bias. "Normal bias," a negative unidirectional voltage, is provided by the connection to the grid of V2 from the plate of V3 and vice versa. This connection also provides regeneration as described in my copending application Serial No. 499,774, filed August 24, 1943, for Follow-up device. When the unidirectional voltage across C1 changes this change is transmitted through C5 and through the time delay network R6 and C3 just as before. For all rates of change which are important, the impedance of C5 is negligible. The operation of this part of the circuit is therefore the same as described for Figure 3.

It will be noted that, in Figure 2, the plate of diode V4 is returned, not directly to ground as in Figure 3, but instead to the secondary of the transformer driven by the triodes. The transformer is so poled that the secondary voltage applied to the plate of V4 has the same phase as the plate voltage of V2. This arrangement helps to prevent hunting when the servo is operated under conditions such that the error may be large. It has been found by experiment that when the diode plate is returned to ground, the servo may hunt on large error signals even though it is well damped for small signals. That is, if the synchronous transformer rotor is pushed a small angular distance away from its called-for position and then released, the amplifier will drive it back to the called-for position without appreciable overshoot. However, if the rotor is pushed a large distance away and then released, overshooting is objectionably large, and hunting may occur. The reason for this action is that when the system is coming back to the called-for position from a large error, the momentum stored up in the mass of moving parts is large. The derivative signal generated in the amplifier is also large and makes the amplifier and motor develop a decelerating torque when the mass comes near the correct position. If the motor could deliver all the torque called for by the derivative signal, it would bring the mass to rest without overshoot. But the torque output of the amplifier and motor is limited and may not be as large as called for by the derivative signal. That is, the derivative signal may drive the output grids past the point where the output tubes deliver their full power output. Under this condition, the amplifier and motor do not develop enough decelerating torque and the system hunts.

When the diode plates are returned, as in Figure 2, to a source of voltage which varies with the voltage on the output grids, the action of the diode differentiating circuit is modified in such a manner as to compensate for the limited torque output of the amplifier and motor. This compensation makes it possible for the system to return without objectionable overshoot or hunting to the correct position after being displaced by a large angle from this position.

I have shown certain values for the elements in Figure 2 which are illustrative values for an operative device and may, of course, be varied as will be understood by those skilled in the art. It is also understood that my invention is capable of various embodiments and I do not desire to be restricted to the particular details shown, but only within the scope of the appended claims.

What is claimed is:

1. In a servo device comprising a director, a follower, and a thermionic amplifier, and having means for applying a signal from said director to the input of said thermionic amplifier, means for driving the follower by the output of said thermionic amplifier to remove said signal, and said thermionic amplifier having a pair of thermionic vacuum tubes each having an anode, a cathode and a grid, means for applying said signal to said grids in push-pull relation, means for applying alternating current across the anodes and cathodes of said tubes in parallel, a rectifier connected in circuit with the grid of each of said vacuum tubes, and means whereby a positive phase of input signal to one of said grids increases the alternating current voltage between said grid and its cathode and decreases the bias voltage of said grid in proportion to the integral of the output of said amplifier.

2. In a servo device comprising a director, a follower, and an electronic amplifier, and means for applying an alternating current signal to the input of said electronic amplifier, said electronic amplifier comprising a pair of thermionic vacuum tubes connected in push-pull relation with respect to said signal and in parallel with respect to an alternating current plate voltage source, a pair of rectifier tubes connected across said source to receive voltage therefrom in the same phase, means whereby error signal is additive with voltage from said source across one of said rectifiers and subtractive across the other, means whereby a bias is applied to said tubes in correspondence with current through said rectifiers, said last means including a pair of time delay circuits connected to said rectifiers whereby a reduction in bias occurs in proportion to the integral of the output of said amplifier.

3. In a servo device comprising a director, a thermionic amplifier, and a follower, means for applying said error signal from the director to the input of an amplifier, and means for driving said follower by the output of said amplifier to remove said signal, and said amplifier comprising a pair of thermionic vacuum tubes each having an anode, a grid and a cathode; means for applying an alternating current voltage across the anodes and cathodes of said tubes, a pair of rectifier tubes, means for applying an alternating current voltage across said tubes, means for applying error signal to said grids in push-pull relationship, means for applying the error signal across said rectifiers in series with the alternating current voltage, additively to one and subtractively to the other, and means comprising a connection from each rectifier to its corresponding amplifier whereby said additive voltage across one of said rectifiers causes a decrease in the grid bias of the grid connected to said rectifier circuit in proportion to the integral of the output of said amplifier.

4. In a thermionic amplifier comprising a pair of vacuum tubes each having an anode, a cathode and a grid, and a pair of rectifiers, means for applying alternating current voltage across the anode-cathode circuits of said vacuum tubes in parallel, means for applying an input alternating current signal to said vacuum tubes and to said rectifiers in push-pull, and a circuit connecting one of said rectifiers with each of said tubes whereby the grid of said tube, with respect to which the alternating current voltage and signal are additive is biased in proportion to the integral of the output of said amplifier.

5. A thermionic amplifier comprising a pair of vacuum tubes each having an anode, a cathode, and a grid, a pair of rectifiers, means for applying an alternating voltage in parallel across the anode-cathode circuits of said vacuum tubes, means for applying an input alternating signal to said vacuum tubes and to said rectifiers in push-pull, and means including a circuit connecting each of said rectifiers to a respective one of said tubes, for biasing the grid of the tube with respect to which the alternating voltage and signal are additive, in proportion to the integral of the output of said amplifier.

6. In a servo device having a director, an amplifier and a follower, and in which the director produces an alternating current error signal, the combination comprising means for supplying said error signal to said amplifier, means for providing a normal bias for said amplifier, means responsive to said error signal for making said normal bias more negative by an amount corresponding to the amplitude and polarity of said error signal, and means for controlling said follower from the output of said amplifier.

7. A combination as in claim 6 further including time delay means included in said means for making said bias more negative.

8. A combination as in claim 7 wherein said amplifier comprises a pair of electron tubes having said error signal impressed in push-pull fashion on the inputs thereof, and a source of alternating current power connected in parallel to the anode-cathode path of said tubes, said normal-bias-providing means comprising a diode rectifier connected across said alternating power source in series with said error signal and coupled to the input to one of said tubes, and a second diode connected across said alternating current power supply in series with an oppositely phased version of said error signal and coupled to the input of the other of said tubes.

9. A combination as in claim 7, wherein said normal-bias-providing means comprises a connection between the input electrode of each of said tubes and the output electrode of the other of said tubes.

FRANCIS H. SHEPARD, Jr.

REFERENCES CITED

The following references are of record in the file of this patent:

UNITED STATES PATENTS

| Number | Name | Date |
|---|---|---|
| 2,040,014 | Moseley | May 5, 1936 |
| 2,088,654 | Hull | Aug. 3, 1937 |
| 2,150,265 | Conover | Mar. 14, 1939 |
| 2,278,212 | Moyer | Mar. 31, 1942 |

Certificate of Correction

Patent No. 2,497,962                                                     February 21, 1950

FRANCIS H. SHEPARD, Jr.

It is hereby certified that errors appear in the printed specification of the above numbered patent requiring correction as follows:

Column 4, line 7, for the word "was" read *were*; column 6, line 5, for "said" before "error" read *an*; line 6, for "an" before "amplifier" read *said*;

and that the said Letters Patent should be read with these corrections therein that the same may conform to the record of the case in the Patent Office.

Signed and sealed this 23rd day of May, A. D. 1950.

[SEAL]

THOMAS F. MURPHY,
*Assistant Commissioner of Patents.*